(12) United States Patent
Bertin

(10) Patent No.: US 9,808,028 B2
(45) Date of Patent: Nov. 7, 2017

(54) FOOD PREPARATION AND METHOD

(71) Applicant: Bruno Bertin, Mechanicsburg, PA (US)

(72) Inventor: Bruno Bertin, Mechanicsburg, PA (US)

( * ) Notice: Subject to any disclaimer, the term of this patent is extended or adjusted under 35 U.S.C. 154(b) by 0 days.

(21) Appl. No.: 14/183,318

(22) Filed: Feb. 18, 2014

(65) Prior Publication Data

US 2015/0230501 A1    Aug. 20, 2015

(51) Int. Cl.
*A23L 5/00* (2016.01)
*A23P 20/20* (2016.01)
*A23L 1/00* (2006.01)
*A23L 5/10* (2016.01)

(52) U.S. Cl.
CPC .............. *A23L 1/0067* (2013.01); *A23L 5/13* (2016.08); *A23L 5/17* (2016.08); *A23P 20/20* (2016.08)

(58) Field of Classification Search
None
See application file for complete search history.

(56) References Cited

U.S. PATENT DOCUMENTS

| | | | |
|---|---|---|---|
| 3,987,209 | A | 10/1976 | Gatineau et al. |
| 4,287,218 | A | 9/1981 | Rich |
| 5,268,189 | A | 12/1993 | Doerter |
| 5,281,426 | A | 1/1994 | Pardo |
| 5,356,649 | A | 10/1994 | LaMotta et al. |
| 6,039,990 | A | 3/2000 | Friedman et al. |
| 2008/0050482 | A1 | 2/2008 | Fereghetti et al. |
| 2010/0034935 | A1 | 2/2010 | Wally |
| 2011/0217439 | A1 | 9/2011 | Morandotti et al. |
| 2011/0229611 | A1* | 9/2011 | Sommerio .............. B65B 11/50 426/129 |
| 2012/0100273 | A1 | 4/2012 | Guillaud |
| 2012/0241336 | A1* | 9/2012 | Finley et al. ................. 206/219 |
| 2013/0125767 | A1 | 5/2013 | Shoshan |
| 2013/0156900 | A1 | 6/2013 | Ranganathan et al. |
| 2013/0240500 | A1 | 9/2013 | Alipour et al. |
| 2013/0284031 | A1 | 10/2013 | Braukmann |

(Continued)

FOREIGN PATENT DOCUMENTS

| | | | |
|---|---|---|---|
| DE | WO 2011134735 A2 * | 11/2011 | ......... A22C 17/0093 |
| JP | H0565182 A | 3/1993 | |
| JP | 2001299313 A | 10/2001 | |

(Continued)

OTHER PUBLICATIONS

Tam, Sous Vide Pork Ribs, NomNomPaleo, posted Mar. 6, 2011 <http://nomnompaleo.com/post/3697965234/sous-vide-pork-ribs>.*

(Continued)

*Primary Examiner* — Viren Thakur
*Assistant Examiner* — Thanh H Nguyen
(74) *Attorney, Agent, or Firm* — Dickinson Wright PLLC

(57) ABSTRACT

A method of preparing a food item includes the steps of placing a first food element in a package base, placing a second food element in the package base, adding a package top to create a package, and drawing the first food element around the second food element by vacuum sealing the package. The method also includes the step of forming a food item in which the first food element substantially envelops the second food element by cooking the first and second food elements in the sealed package. Each food element retains its identity after cooking.

23 Claims, 6 Drawing Sheets

(56) References Cited

U.S. PATENT DOCUMENTS

2013/0302475 A1    11/2013    Chichowski et al.

FOREIGN PATENT DOCUMENTS

| JP | 2003169620 A | 6/2003 | |
|---|---|---|---|
| JP | 2008260558 A | 10/2008 | |
| WO | WO 2011134735 A2 | 11/2011 | ......... A22C 17/0093 |
| WO | WO 2011149900 A1 * | 12/2011 | |

OTHER PUBLICATIONS

Escolar, Fresh Meals Magic: Turkey Burgers Sous Vide, Medellitin, posted Mar. 1, 2010. <https://web.archive.org/web/20111025053106/http://blog.medellitin.com/2010/05/fresh-meals-magic-turkey-burgers-sous.html>.*

Vittle Monster, Juicy Lucy Butter Burger-Maverick, posted Jul. 27, 2011 <http://vittlemonster.com/2011/07/27/juicy-lucy-butter-burger-maverick/>.*

Kasguma, Pork Spare Ribs #2, Rick's cooking and food blog, posted Mar. 17, 2012 <http://blog.rickk.com/food/2012/03/pork-spare-ribs-2.html>.*

CosmedGroup, Pasteurization and Sterilization for Herbs and Spices, Captured Jul. 9, 2012. <http://cosmedgroup.com/industry-solutions/herbs-and-spices>.*

Madehow, How cheese is made, <http://www.madehow.com/Volume1/Cheese.html>.*

Grocery Coupon Guide, The Plastic Bag Omelet-Day 78: Eating Well on $1 a Day, Jul. 2010, <http://www.grocerycouponguide.com/articles/the-plastic-bag-omelet-day-78-eating-well-on-1-a-day/>.*

Madehow, How sugar is made, <http://www.madehow.com/Volume-1/Sugar.html>.*

Bertone, Boneless Pork Loin Roast with Herbed Pepper Rub, Farm Flavor, 2012 <http://www.farmflavor.com/recipe/type/entrees/boneless-pork-loin-roast-with-herbed-pepper-rub/>.*

Tammy, Kitchen Tip Tuesdays: Freezer meal tips, Tammy's Recipe, captured 2010, <http://web.archive.org/web/20100314191652/http://www.tammysrecipes.com/node/3704>.*

Sous Vide Supreme, Sous Vide omelette party, 2011 <http://blog.sousvidesupreme.com/2011/04/sous-vide-omelette-party/#sthash.7CfspAp0.O5ZUpOwM.dpbs>.*

Navid, Artichoke Omelette, 1001recipe.com, 2009 <http://www.1001recipe.com/recipes/food/artichoke_omelette/>.*

Logsdon, Sous Vide Sausage and Peppers, Amazon Food Made Easy, 2011 <http://www.amazingfoodmadeeasy.com/info/modernist-recipes/more/sous-vide-sausage-and-peppers-recipe>.*

Lopez-Alt, Sous Vide Burgers Recipe, Serious Eats, 2010 <http://www.seriouseats.com/recipes/2010/06/sous-vide-burgers-recipe.html>.*

USDA, Branded Food Product Database, Nutrition Data for elbow Macaroni.*

Daninnewjersey, Garlic Parmesan Ribs, BBQ-Brethren, 2012 <http://www.bbq-brethren.com/forum/showthread.php?t=134923>.*

Fernandez, Chili Cheese Omelet, Just a Pinch Recipes, 2011 <http://www.justapinch.com/recipes/breakfast/egg-breakfast/chili-cheese-omelet.html>.*

Diamond, Omelet in a Bag, Washington Post, 2004 <https://web.archive.org/web/20161212200700/http://www.washingtonpost.com/wp-dyn/articles/A8359-2004Aug17.html>.*

Tammy, Kitchen Tip Tuesdays: Freezer meal tips, Tammy's Recipe, captured 2010, <https://web.archive.org/web/20100314191652/http://www.tammysrecipes.com/node/3704>.

USDA, Branded Food Product Database, Nutrition Data for elbow Macaroni, Dec. 9, 2016.

Madehow, How cheese is made, <http://www.madehow.com/Volume1/Cheese.html>, Retrieved Feb. 24, 2016.

Madehow, How sugar is made, <http://www.madehow.com/Volume-1/Sugar.html>, Retrieved Feb. 29, 2016.

* cited by examiner

FOOD PREPARATION AND METHOD

BACKGROUND OF THE INVENTION

1. Field of the Invention

The present invention relates to prepared food items and method of preparing such food items, and more particularly, to packaged food items and methods of food preparation and packaging.

2. Description of the Related Art

High Heat Food Preparation

Currently, there is a market for pre-cooked, packaged food. For example, busy people, restaurants, and the military desire the convenience provided by such products. Typically, such food items are cooked and then packaged, usually being either chilled or frozen for travel to their ultimate destination. As an example, pot roast, turkey and gravy, or meatloaf can be cooked and then packaged prior to chilling for transport to a grocery store, where the food item is stored and displayed in a refrigerated case.

These examples are typically prepared using high heat cooking methods, such as baking in an oven. Other examples of high heat cooking methods include grilling or broiling. These high heat methods often result in food that is unevenly cooked and lose some of their natural juices. While such results may be desirable for foods such as a medium rare steak, for many foods a more even cooking is desirable. In addition, subsequent to cooking and prior to packaging, the opportunity exists for the cooked food to come into contact with bacteria prior to packaging, thereby potentially contaminating the food, and at least limiting the shelf life of the food.

Additionally, the ability to provide a high-quality, consistent product often relies on the culinary skill of the end user. Without proper training, consistent desired results are difficult to achieve.

SUMMARY OF EMBODIMENTS OF THE INVENTION

Accordingly, it is an aspect of the present invention to provide a process via which a consistent, high quality food product can be delivered without significant culinary skill on the part of an end user.

The foregoing and/or other aspects of the present invention are achieved by providing a method of preparing a food item, including the steps of placing a first food element in a package base, placing a second food element in the package base, adding a package top to create a package, and drawing the first food element around the second food element by vacuum sealing the package. The method also includes the step of forming a food item in which the first food element substantially envelops the second food element by cooking the first and second food elements in the sealed package. Each food element retains its identity after cooking.

The foregoing and/or other aspects of the present invention are also achieved by providing a vacuum-sealed, multi-component, sous-vide-cooked food item, including a first food element forming a structural envelope around a second food element that was not fully cooked prior to being enveloped during vacuum packing.

Additional and/or other aspects and advantages of the present invention will be set forth in the description that follows, or will be apparent from the description, or may be learned by practice of the invention.

BRIEF DESCRIPTION OF THE DRAWINGS

The above and/or other aspects and advantages of embodiments of the invention will be more readily appreciated from the following detailed description, taken in conjunction with the accompanying drawings, of which.

DETAILED DESCRIPTION

Figure 1:
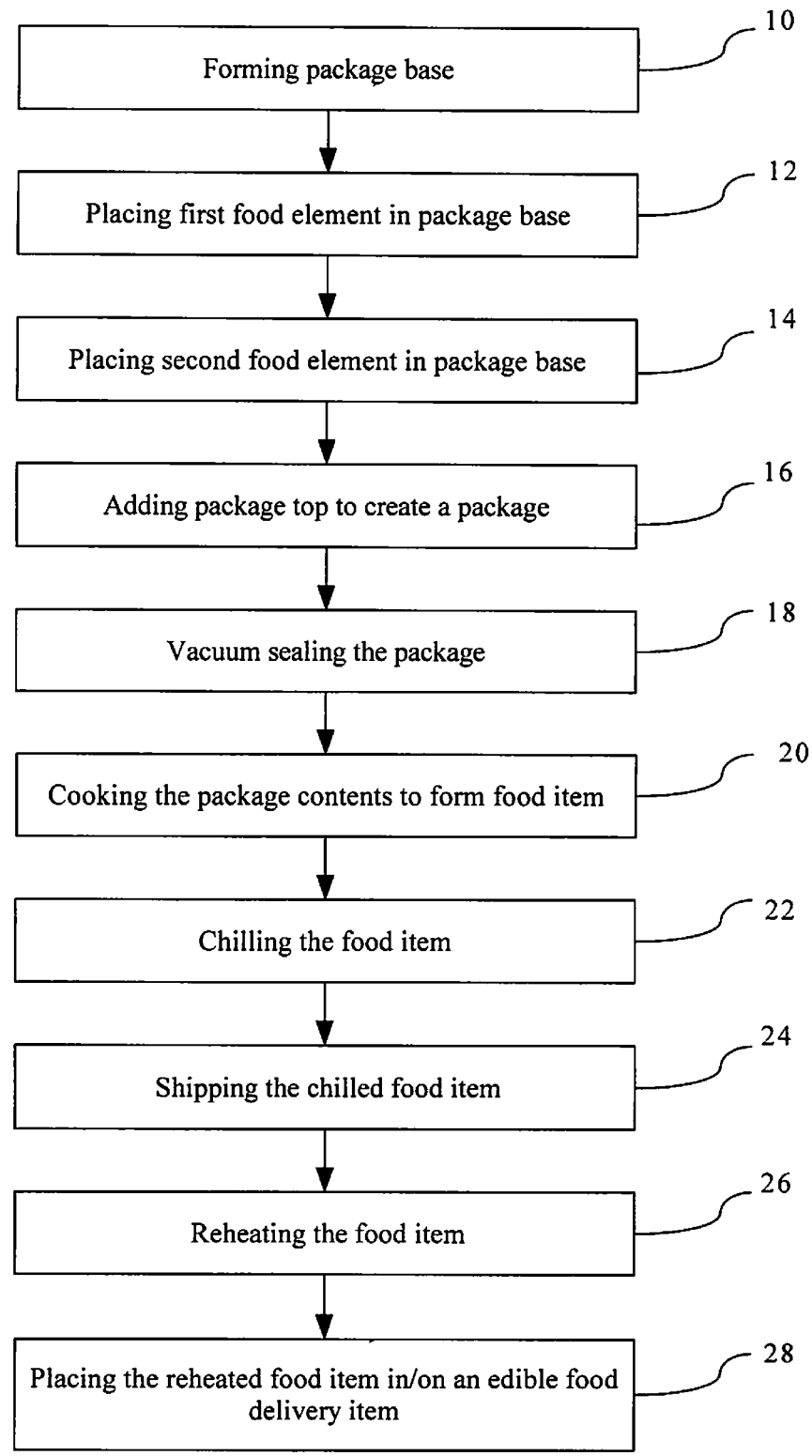
FIG. 1 is a flow chart of a method in accordance with an embodiment of the present invention.

Reference will now be made in detail to embodiments of the present invention, which are illustrated in the accompanying drawings, wherein like reference numerals refer to like elements throughout. The embodiments described herein exemplify, but do not limit, the present invention by referring to the drawings. As will be understood by one skilled in the art, terms such as up, down, bottom, and top are relative, and are employed to aid illustration, but are not limiting.

Additionally, although many people can be involved in the described processes to produce and use the described food items, for brevity, they are collectively described as a single user. One skilled in the art will appreciate however, that embodiments of the present invention are not limited to a single user.

Sous-vide cooking is a method of sealing food in an airtight container (generally a plastic bag) and cooking the food in the sealed container in a water bath with a well-regulated temperature. In sous-vide cooking processes, the inside and outside of the food item cook to substantially the same level and the food maintains its natural juices.

Generally, the sous-vide cooking temperature is much lower than temperatures normally used for cooking. For example, in high heat cooking methods, such as roasting or broiling in an oven, or grilling, temperatures of 140-260° C. (~300-500° F.) or higher are common, whereas with sous-vide cooking, typical temperatures for cooking meats are about 55-60° C. (~130-140° F.) and typical vegetable cooking temperatures are slightly higher.

FIGS. 1-11 illustrate a method of preparing a pre-cooked, multi-component food item in accordance with an embodiment of the present invention. According to one embodiment, the fully-cooked, multi-component food item is sous-vide cooked.

In step 10, a user forms a package base 40 into a predetermined shape, preferably by vacuum forming a plastic sheet into the predetermined shape. One skilled in the art will understand that other materials can be employed for the package base 40. The plastic is preferably food-grade plastic, such as polyethylene terephthalate (PET or PETE). More preferably the plastic is free of phthalates and bisphenol A (BPA).

Figure 2:
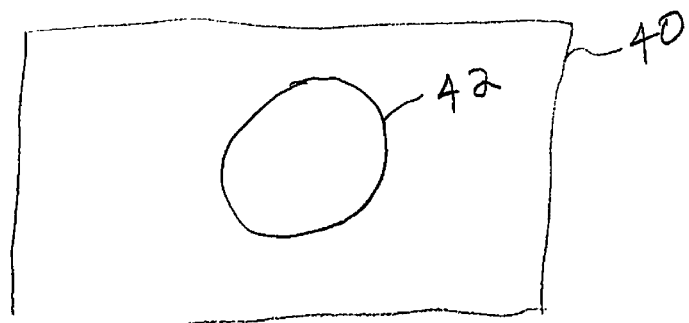
FIG. 2 is a top, plan view of a package base in accordance with an embodiment of the present invention.
Figure 3:
FIG. 3 is a cross-sectional view of the package base of FIG. 2.

According to one embodiment, the predetermined shape is a cup-shape 42, as shown in FIGS. 2 and 3. As described in greater detail below, however, embodiments of the present invention are not limited to such cup-shapes.

Figure 4:
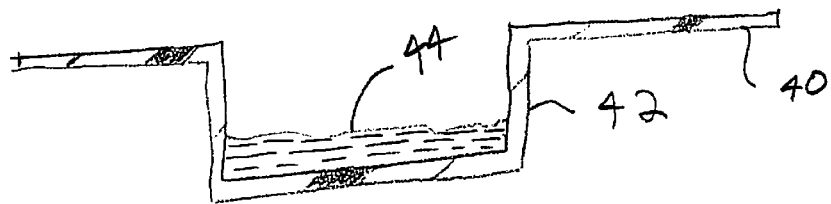
FIG. 4 is a cross-sectional view of the package base of FIG. 2 with a first food element disposed therein.

In step 12, the user places a first food element 44 in the package base 40, as shown in FIG. 4. Examples of the first food element 44 include, but are not limited to an egg (e.g., beaten), egg white, cheese, crepe dough, or raw puff pastry. According to one embodiment, the first food element 44 is a liquid. Preferably the first food element 44 is pasteurized, but uncooked prior to being introduced into the package base 40. According to one embodiment, the first food element is not meat.

Pasteurization is a process of heating a food to a certain temperature (generally around 70° C. (~160° F.), for a period of time, and then cooling the item subsequent to removing it from the heat. The goal of pasteurization is to kill most of the harmful germs (so that they are unlikely to cause illness) without major chemical alteration of the food. In contrast, cooking causes a chemical alteration of the food.

Figure 5:
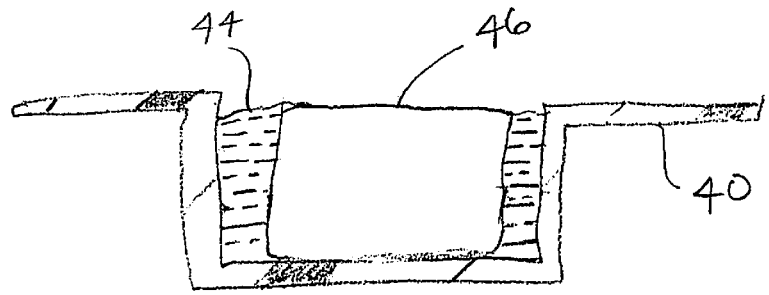
FIG. 5 is a cross-sectional view of the package base and first food element of FIG. 4 with a second food element disposed therein.

Subsequently, in step 14, and as shown in FIG. 5, the user places a second food element 46 in the package base 40. Examples of the second food element 46 include, but are not limited to chili, tomatoes, vegetables (such as spinach, artichokes, onions, and mushrooms), cheese, rice, pasta, or meat (for example, sausage, beef (such as hamburger), ham, bacon, turkey, or chicken), or a combination of these elements. According to one embodiment, the second food element is not meat. Preferably, both the first and second food elements 44 and 46 are proteins. Also, preferably the second food element 46 is pasteurized, but uncooked prior to being introduced into the package base 40. It will be understood by one skilled in the art, however, that the first and second food elements can be pasteurized after a vacuum sealing step (step 18, subsequently-described in greater detail).

Additionally, it will be understood that it may not be desirable for all the natural juices of a food element, such as the second food element 46, to be included in a final, cooked food item. Or, it may be desirable for the exterior of one of the food elements to undergo a Maillard reaction (browning). Accordingly, at least one of the food elements can be cooked or par-cooked prior to placing the food element in the package base 40.

Figure 6:
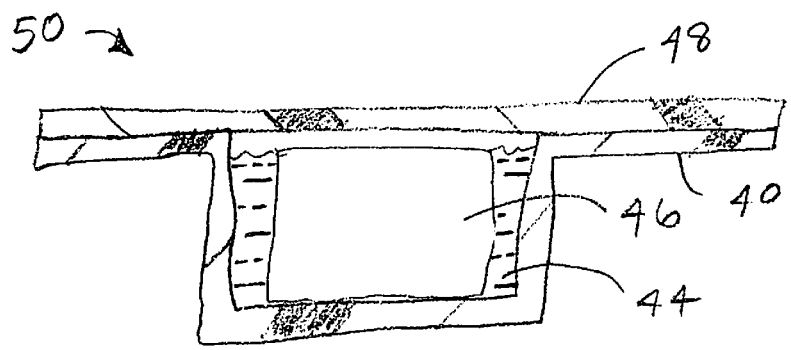
FIG. 6 is a cross-sectional view of the base of FIG. 2 with a package top thereon to form a package.

Next, as shown in FIG. 6, the user adds a package top 48 (step 16) to form a package 50. Preferably the package top 48 is a plastic sheet, but one skilled in the art will understand that other materials can be employed for the package top 48. The plastic is preferably food-grade plastic, such as polyethylene terephthalate (PET or PETE). More preferably the plastic is free of phthalates and bisphenol A (BPA). In sous-vide cooking, the package, and in particular, a plastic package, provides a barrier between the water and the food and allows efficient heat transfer from the water to the food.

Figure 7:
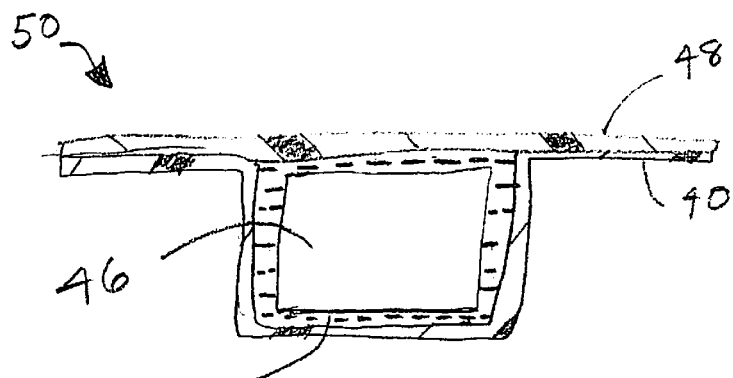
FIG. 7 is a cross-sectional view of the package of FIG. 6 in a vacuum-sealed state.
Figure 8:
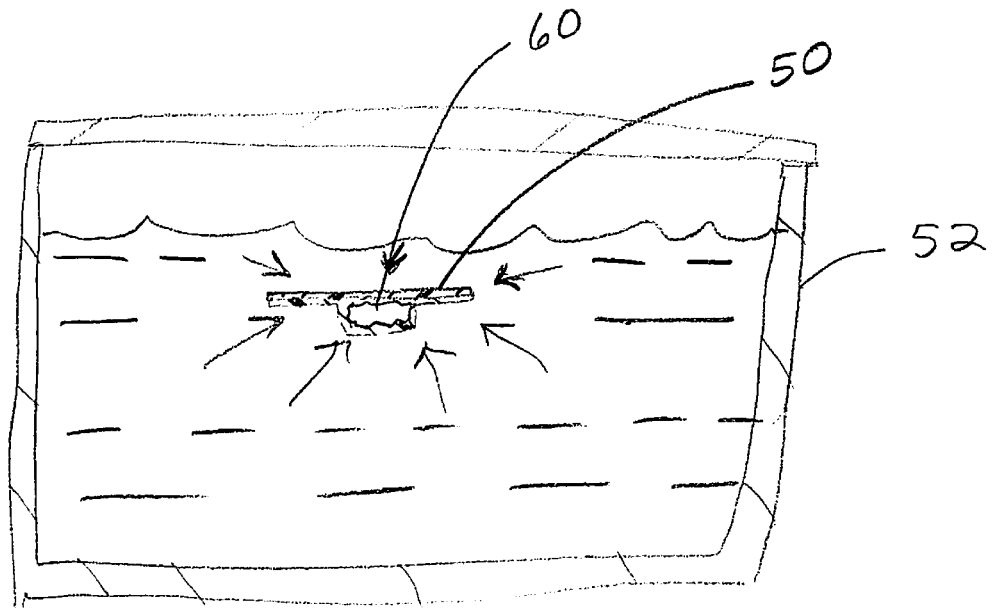
FIG. 8 is a cross-sectional view of the sealed package of FIG. 7 being cooked to form a food item.

Subsequently, in step 18, the user vacuum seals the package 50 (FIG. 7). This vacuum sealing not only draws air out of the package, but also draws the first food element 44 around the second food element 46. The vacuum sealing can also draw the first food element 44 into voids of the second food element 46. Vacuum sealing is known to those skilled in the art, and further description is omitted for brevity.

Following the vacuum sealing, the user cooks the first and second food elements 44 and 46 in the sealed package 50 (step 20 and FIG. 8), using, for instance, a sous-vide cooking method and a cooker 52, to form a fully-cooked food item 60. The user can also use steam to cook the first and second food elements 44 and 46 in the sealed package 50.

As an example, the first food element 44 can be an uncooked, pasteurized egg, and the second food element 46 can be uncooked, pasteurized sausage meat. After vacuum sealing, the user cooks the contents of the package 50 in a water bath at 73° C. (169° F.) for approximately 25 minutes. As a result of the cooking, the first and second food elements 44 and 46 retain their identity in the fully-cooked food item 60; the cooked egg forms a structural envelope around, and substantially encases the cooked sausage patty.

As another example, the first food element 44 can be pasteurized cheese, and the second food element 46 can be par-cooked, pasteurized hamburger meat. The hamburger meat can be par-cooked using, for example, a sous-vide cooking process, and can reach its final temperature during the enrobing process that forms the fully cooked food item.

The cheese should be large enough to be able to surround the hamburger. Alternatively, two slices of cheese can be used, for example, a first large piece of cheese in the bottom of the package base, and a second smaller piece on top of the hamburger. After vacuum sealing, the contents of the package 50 are cooked in a water bath at 85° C. (185° F.) for approximately 5 minutes. As a result of the cooking, the cheese forms a structural envelope around, and substantially encases or enrobes the cooked hamburger meat.

As a further example, the first food element 44 can be pasteurized cheese, and the second food element 46 can be uncooked, pasteurized hamburger meat. One skilled in the art will understand that raw meat should be cooked in accordance with standards of the U.S. Food and Drug Administration to have a safe internal temperature, as subsequently discussed in greater detail. Sous vide cooking, however can be employed, for example, to cook hamburger meat to have a red or pink center if desired.

The cheese should be large enough to be able to surround the hamburger. Alternatively, two slices of cheese can be used, for example, a first large piece of cheese in the bottom of the package base, and a second smaller piece on top of the hamburger. After vacuum sealing, the contents of the package 50 are cooked in a water bath at 85° C. (185° F.) for approximately 5 minutes. Subsequently, the contents of the package 50 are cooled to a temperature below the melting point of the cheese. As a result, the cheese forms a structural envelope around, and substantially encases or enrobes the hamburger meat.

Then, the contents of the package 50 are be cooked in a water bath to bring the hamburger meat to the desired internal temperature, but at a temperature below the melting point of the cheese. For example, the user can cook the contents of the package 50 in a water bath at 71° C. (165° F.) for approximately 25 minutes. Thus, the structural integrity of the cheese envelope is maintained, and the hamburger meat is cooked inside, retaining the natural juices. Although meat of differing fat contents can be employed without departing from the scope of the present invention, when using very lean meat, retention of all of the juices results in a desirably moist food item. Thus, embodiments of the inventive process can produce a lower-fat food item that is still desirably moist.

As yet another example, the first food element 44 can be an uncooked, pasteurized egg white, and the second food element can be uncooked bell pepper. Additional food elements, such as onion, mushrooms, or cheese can be added as well. After vacuum sealing, the contents of the package 50 are cooked in a water bath at 73° C. (169° F.) for approximately 25 minutes. As a result of the cooking, the egg white forms a structural envelope around, and substantially encases the pepper (and other food elements).

Similar processes can be employed to provide other food items, such as a chili cheese dog (in which the cheese-enrobes chili and the hot dog),enrobed omelets (such as spinach and feta cheese enrobed in egg white, sausage and cheese enrobed in egg, roasted tomatoes and artichokes enrobed in egg, and chicken taco enrobed in egg and shaped in a triangle as subsequently described in greater detail), and other cheese-enrobed elements or combinations (such as roasted tomato and artichoke patty, turkey chili patty, beef chili patty, Latin spice patty, chicken tacos shaped in a triangle, beef short rib fricassee patty, and a thin-shaved roast beef (Philly)). One skilled in the art will understand, however, that embodiments of the present invention are not limited to these examples.

As opposed to a sauce or a marinade, subsequent to the cooking, the first food element substantially structurally envelops the second food element, and is self-supporting or self-coherent. Preferably, after cooking, the first food element does not ooze, and is not leathery.

The U.S. Food and Drug Administration (FDA) recommends that the internal temperature of certain food products reach certain levels to be "safe." For example, the FDA recommends that ground meat and meat mixtures of beef, pork, veal, and lamb should reach an internal temperature of 71° C. (160° F.) and that fresh beef, pork, veal, and lamb should reach an internal temperature of 63° C. (145° F.). Similarly, poultry should reach an internal temperature of 74° C. (165° F.). According to one embodiment, when enrobing one or more of these elements in, for example, cheese, the elements can be cooked or par-cooked to bring the element to or near to its recommended "safe" internal temperature prior to enrobing because the heat transfer required to melt the cheese is less than that required to bring the element from a refrigerated state to its recommended "safe" internal temperature.

Figure 9:
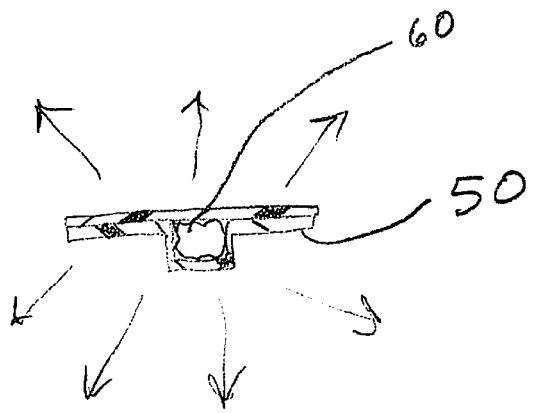
FIG. 9 is a cross-sectional view of the food item of FIG. 8 being chilled.
Figure 10:
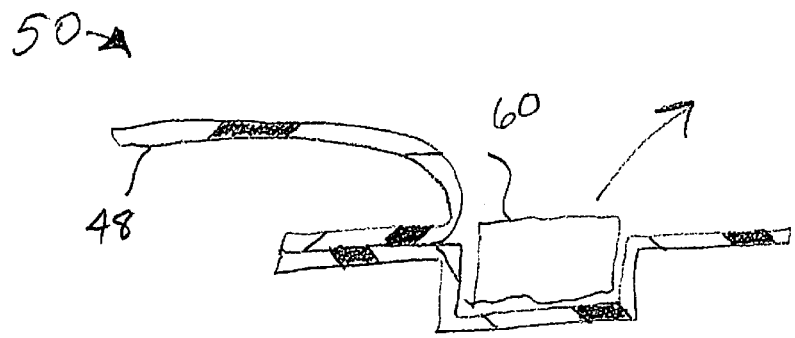
FIG. 10 is a cross sectional view of an opened package exposing the food item of FIG. 8.
Figure 11:
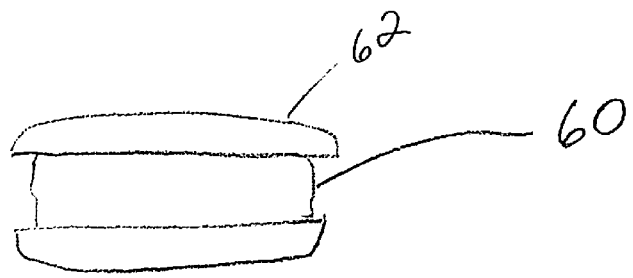
FIG. 11 is a front view of the food item of FIG. 8 served on an edible food delivery item.

After the cooking, and while still sealed in the package 50, the user can chill the food item 60 (step 22 and FIG. 9). According to one embodiment, the user refrigerates the food item 60. According to another embodiment, the user freezes the food item 60. The user can then ship the food item 60 (step 24), for example, to a restaurant, a grocery store, or a home.

Subsequently, and while still sealed in the package 50, the user can re-heat the food item (step 26) using, for example, an oven, a microwave oven, or a water bath, for example, a pot of warm or hot water, or a sous-vide cooker. Subsequent to the reheating (or merely subsequent to the cooking step, without the chilling, shipping, and re-heating steps) the user can remove the food item 60 from the package 50 (FIG. 10), and placed on or in an edible food delivery item 62, such as a bun, bread, a biscuit, a taco shell, a tortilla, a pancake, or flat bread (FIG. 11) for eating. Thus, an embodiment of the inventive process produces a food item that is ready for the edible food delivery item 62 in a single step.

Figure 12:
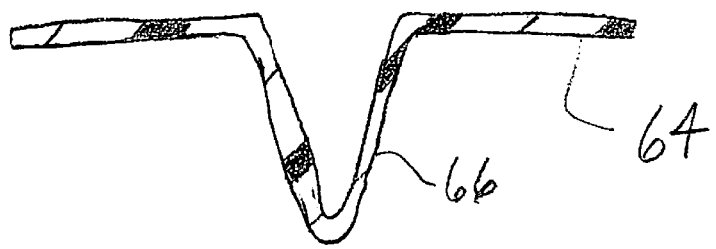
FIGS. 12 and 13 are respective cross-sectional views of alternative package bases in accordance with embodiments of the present invention.
Figure 13:
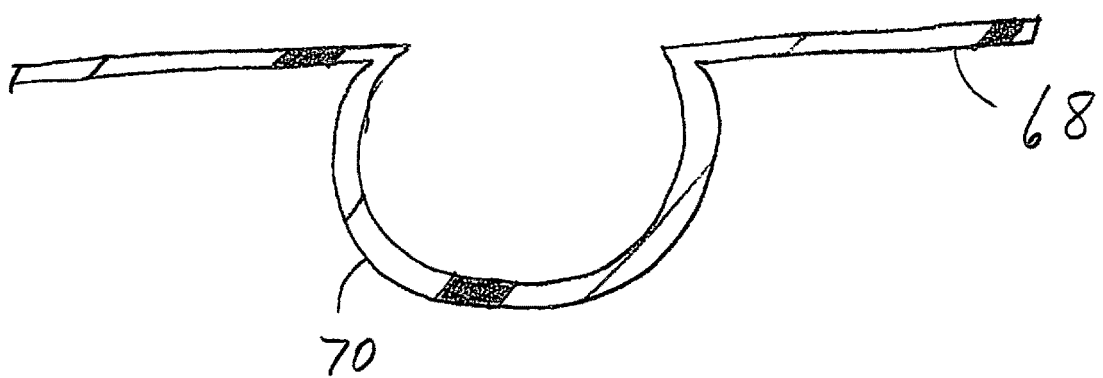

For edible delivery items 62 such as a taco shell or a soft tortilla, the second food 46 element can be pre-shaped to a specific desired shape prior to insertion into the package base 40. Alternatively, the mold employed during the step of forming the package base (step 10) can form a mold for the second food element 46, such that during the vacuum sealing step (step 18), the second food element 46 is formed to the desired shape. For example, as shown in FIG. 12, the package base 64 can be formed with a triangle or V-shape 66, so that the resulting food item can conveniently be placed in a hard taco shell. Similarly, as shown in FIG. 13, the package base 68 can be formed into a substantially cylindrical tube 70, so that the resulting food item can conveniently be placed into a soft tortilla, which the user can then fold around the food item.

According to one embodiment, a process in accordance with an embodiment of the present invention can be used multiple times to achieve a desired end food item. For example, as previously-described, the first food element can be an uncooked, pasteurized egg, and the second food element can be uncooked, pasteurized sausage meat. After vacuum sealing, the user cooks the contents of the package 50 in a water bath at 73° C. (169° F.) for slightly less time: approximately 20 minutes. As a result of the cooking, the first and second food elements 44 and 46 retain their identity in the mostly-cooked food item; the mostly-cooked egg forms a structural envelope around, and substantially encases the mostly-cooked sausage patty.

Then the user places a third food element, such as cheese into a second package base, removes the mostly-cooked food item from the package, and places it in the second package base, on the cheese, and then either folds over the cheese, or uses a second piece of cheese on top. During the subsequent vacuum sealing after adding a package top to form a second package, the cheese is drawn around the mostly-cooked food item. Then, the user cooks the third food element and the food item, for example, in a water bath at 85° C. (185° F.) for approximately 5 minutes to form a second food item. In the second food item, the first, second, and third food elements retain their identity, and upon cooling below the melting point of the cheese, the third food element (cheese) forms a structural envelope around, and substantially encases the first food item (egg encasing the sausage).

Embodiments of the inventive method provide a controlled food preparation process that does not depend on the culinary skill of the final user. For example, the food item 60 can be re-heated and placed on the edible food delivery item 62 by a user (e.g., a restaurant employee, or home user) who has minimal training. Thus, because the quality is controlled during the process, a consistent, high quality product can be delivered by employing embodiments of the inventive method.

Although only a few embodiments of the present invention have been shown and described, the present invention is not limited to the described embodiments. Instead, it will be appreciated by those skilled in the art that changes may be made to these embodiments without departing from the principles and spirit of the invention, the scope of which is defined by the appended claims and their equivalents.

What is claimed is:

1. A method of preparing a food item, comprising the steps of:
   placing a first food element in a package base, the first food element consisting of cheese;
   placing a second food element in the package base on top of the first food element, the second food element comprising at least one meat and consisting of a core structure;
   adding a package top onto the package base to create a sealable package;
   withdrawing air from the package with a vacuum to seal the package and draw the first food element at least partially around the second food element, thereby forming an uncooked, packaged, vacuum-sealed food item;

cooking the uncooked, packaged, vacuum-sealed food item by a sous vide cooking method to form a cooked, packaged, vacuum-sealed food product in which the first food element substantially envelops the second food element in the sealed package to form an outermost layer of the food product that remains external to the core structure, each food element remaining distinct after cooking.

2. The method according to claim 1, wherein the first food element substantially envelops the second food element after removal from the sealed package.

3. The method according to claim 1, further comprising forming the package base.

4. The method according to claim 3, wherein forming the package base comprises vacuum forming the package base prior to adding the package top.

5. The method according to claim 1, wherein the first food element is substantially uncooked prior to placing it in the package base.

6. The method according to claim 5, wherein the second food element is uncooked, pasteurized sausage meat.

7. The method according to claim 1, wherein the second food element is uncooked, pasteurized hamburger meat.

8. The method according to claim 7, further comprising adding additional cheese on top of the hamburger meat before adding the package top.

9. The method according to claim 1, further comprising chilling the food item in the package after the cooking step.

10. The method according to claim 9, wherein chilling the food item comprises freezing the food item.

11. The method according to claim 1, further comprising pre-forming the second food element into a predetermined shape prior to the cooking step using a mold.

12. The method according to claim 11, wherein the predetermined shape comprises a substantially circular or rectangular patty.

13. The method according to claim 11 wherein the predetermined shape comprises one of a triangular prism, cylindrical, or a substantially rectangular solid shape.

14. The method according to claim 9, further comprising shipping the chilled food item in the package.

15. The method according to claim 14, further comprising reheating the food item in the package.

16. The method according to claim 15, further comprising removing the reheated food item from the package and placing the food item in/on an edible food delivery item.

17. The method according to claim 16, wherein the edible food delivery item comprises one of a bun, bread, an English muffin, a croissant, a hard taco shell, a soft taco shell, a tortilla, a pancake, or flat bread.

18. The method according to claim 1, further comprising:
placing a third food element in a second package base;
removing the food item from the sealed package and placing the food item in the second package base;
adding a second package top subsequent to placing the third food element and the food item in the second package base to create a second package;
drawing the third food element around the food item by vacuum sealing the second package;
forming a second food item in which the third food element substantially envelops the first food item by cooking the food item and the third food element in the sealed second package, the first, second, and third food elements retaining their respective identities after cooking.

19. The method according to claim 1, comprising forming the package base into a predetermined shape prior to introduction of food elements to ensure a desired shape of the food item.

20. The method according to claim 19, wherein the package base is a formed film.

21. The method according to claim 1, wherein the package top is added subsequent to placing food elements in the package base.

22. The method according to claim 1, wherein the second food element is placed in the package base subsequent to the first food element being placed in the package base.

23. The method according to claim 1, wherein the second food element comprises chili stew.

* * * * *